United States Patent
Barfoot et al.

(10) Patent No.: US 9,766,371 B2
(45) Date of Patent: Sep. 19, 2017

(54) REFLECTOR CONFIGURATION FOR DISTRIBUTED SENSING IN AN OPTICAL FIBER NETWORK USING MULTIPLE SETS OF CIRCULATORS

(71) Applicant: HALLIBURTON ENERGY SERVICES, INC., Houston, TX (US)

(72) Inventors: David Andrew Barfoot, Houston, TX (US); Michel Joseph LeBlanc, Houston, TX (US); Neal Gregory Skinner, Lewsville, TX (US)

(73) Assignee: HALLIBURTON ENERGY SERVICES, INC., Houston, TX (US)

(*) Notice: Subject to any disclaimer, the term of this patent is extended or adjusted under 35 U.S.C. 154(b) by 248 days.

(21) Appl. No.: 14/389,964

(22) PCT Filed: Oct. 17, 2013

(86) PCT No.: PCT/US2013/065355
§ 371 (c)(1),
(2) Date: Oct. 1, 2014

(87) PCT Pub. No.: WO2015/057224
PCT Pub. Date: Apr. 23, 2015

(65) Prior Publication Data
US 2016/0259083 A1    Sep. 8, 2016

(51) Int. Cl.
*G01V 8/16* (2006.01)
*G01L 1/24* (2006.01)
(Continued)

(52) U.S. Cl.
CPC .............. *G01V 8/16* (2013.01); *E21B 47/00* (2013.01); *E21B 47/065* (2013.01);
(Continued)

(58) Field of Classification Search
CPC . G01V 8/16; H04B 10/27; H04J 14/08; E21B 47/00; E21B 47/065; E21B 4/123;
(Continued)

(56) References Cited

U.S. PATENT DOCUMENTS

| 5,194,847 A | 3/1993 | Taylor et al. |
| 7,030,971 B1 | 4/2006 | Payton |

(Continued)

FOREIGN PATENT DOCUMENTS

| GB | 2397879 | 8/2004 |
| KR | 1020110112086 | 10/2011 |

(Continued)

OTHER PUBLICATIONS

Fischer, Applying DAS in Oil & Gas Operations, Novus Light Technologies, Today News and Analysis from the world of light, Oct. 8, 2012, 4 pages.

(Continued)

*Primary Examiner* — Michael P Lapage
(74) *Attorney, Agent, or Firm* — Kilpatrick Townsend & Stockton LLP (57) ABSTRACT

A distributed optical fiber sensing system is provided. The system can include an interrogator, a transmission optical fiber, a sensing optical fiber, and a reflector. Each of the transmission optical fiber and the sensing optical fiber includes at least one circulator. The reflector is optically coupled to the transmission optical fiber for sensing separate regions along the sensing optical fiber.

16 Claims, 7 Drawing Sheets

(51) Int. Cl.
*E21B 47/12* (2012.01)
*E21B 47/06* (2012.01)
*E21B 47/00* (2012.01)
*H04B 10/27* (2013.01)
*H04J 14/08* (2006.01)
*E21B 43/26* (2006.01)

(52) U.S. Cl.
CPC ............ *E21B 47/123* (2013.01); *G01L 1/246* (2013.01); *H04B 10/27* (2013.01); *H04J 14/08* (2013.01); *E21B 43/26* (2013.01)

(58) Field of Classification Search
CPC .. E21B 43/26; G01D 5/35303; G01D 5/3539; G01D 5/35387; G01B 11/16; G01B 11/165; G01L 1/246; G01L 1/242; G01L 1/241
See application file for complete search history.

(56) References Cited

U.S. PATENT DOCUMENTS

| | | | | |
|---|---|---|---|---|
| 7,274,441 | B2 | 9/2007 | Payton | |
| 7,864,329 | B2* | 1/2011 | Berthold | ............ G01D 5/35303 356/478 |
| 7,872,736 | B2 | 1/2011 | Rogers et al. | |
| 7,946,341 | B2 | 5/2011 | Hartog et al. | |
| 2006/0076476 | A1* | 4/2006 | Thingbo | ............... G01D 5/3539 250/227.23 |
| 2006/0127004 | A1* | 6/2006 | Waters | ................. G02B 6/2932 385/37 |
| 2006/0139652 | A1* | 6/2006 | Berthold | ............ G01D 5/35303 356/478 |
| 2007/0196048 | A1* | 8/2007 | Galvanauskas | .... G02B 6/02085 385/37 |
| 2008/0068586 | A1* | 3/2008 | Kishida | .................. G01B 11/18 356/32 |
| 2008/0088846 | A1* | 4/2008 | Hayward | ............. H04B 10/071 356/446 |
| 2009/0238513 | A1 | 9/2009 | Hao et al. | |
| 2012/0277995 | A1 | 11/2012 | Hartog et al. | |
| 2013/0021615 | A1 | 1/2013 | Duncan et al. | |
| 2014/0138528 | A1 | 5/2014 | Pope et al. | |
| 2014/0152995 | A1 | 6/2014 | Dong et al. | |
| 2014/0163889 | A1 | 6/2014 | Finfer et al. | |

FOREIGN PATENT DOCUMENTS

| | | |
|---|---|---|
| WO | 2008009380 A1 | 8/2008 |
| WO | 2009011766 | 1/2009 |
| WO | 2012068558 | 5/2012 |

OTHER PUBLICATIONS

"RIO Colorado Tunable Laser Source", retrieved from the Internet at least as early as May 2013, http://www.rio-inc.com/_products/tunable.html, 2 pages.

International Patent Application No. PCT/US2013/065355, "PCT Search Report/Written Opinion", mailed Jul. 7, 2014, 13 pages.

Varshney et al., "Raman Amplification Properties of Photonic Crystal Fibers", International Journal of Microwave and Optical Technology, Division of Media and Network Technologies, vol. 1, No. 1, Jun. 2006, 8 pages.

Xu et al., "Fiber Strain Measurement for Wide Region Quasi Distributed Sensing by Optical Correlation Sensor with Region Separation Techniques", Journal of Sensors, 2010, 11 pages.

United Kingdom Patent Application No. 1601876.4, Office Action, mailed Sep. 27, 2016, 2 pages.

Canadian Patent Application No. 2,920,607, Office Action, mailed Oct. 3, 2016, 4 pages.

\* cited by examiner

REFLECTOR CONFIGURATION FOR DISTRIBUTED SENSING IN AN OPTICAL FIBER NETWORK USING MULTIPLE SETS OF CIRCULATORS

CROSS-REFERENCE TO RELATED APPLICATIONS

This is a U.S. national phase under 35 U.S.C. 371 of International Patent Application No. PCT/US2013/065355, titled "Distributed Sensing in an Optical Fiber Network" and filed Oct. 17, 2013, the entirety of which is incorporated herein by reference.

TECHNICAL FIELD

The present disclosure relates generally to distributed sensing multiple regions in an optical fiber network.

BACKGROUND

Distributed sensing can involve sensing parameters at different locations along a sensing network. Each location may need to be sensed independently using signals that travel along the entire sensing network. Signals traveling along the entire sensing network can involve delays and a low data acquisition rate.

DETAILED DESCRIPTION

Certain aspects and features relate to providing high bandwidth distributed sensing in an optical fiber network using optical backscatter and time-division multiplexing. The optical fiber network includes multiple regions, each region having a shorter length than the total length of an optical fiber. A higher pulse repetition rate of an optical signal can be used for sensing among multiple locations within the optical fiber network. Several parameters can be sensed in a distributed manner. Examples of parameters include temperature, acoustic, and strain. Distributed sensing can be performed selectively over a particular region of a sensing fiber with higher bandwidth than normally allowed with time-domain multiplexing interrogation methods.

In one aspect, a system includes at least two optical fibers. One optical fiber carries optical signals transmitted by an interrogator and another optical fiber is a sensing fiber that includes sensing regions in which optical backscatter is generated. Included in the optical fiber that carries the transmitted optical signals are one or more circulators and one or more reflectors. Each reflector is associated with a distinct optical wavelength at which the reflector reflects optical signals, and allows other wavelengths to pass through. An optical signal having an optical wavelength associated with a reflector can be reflected toward a circulator that can route the reflected optical signal to the sensing fiber in which the reflected signal creates a backscatter signal within a sensing region. The backscatter signal can be received by the interrogator and measured to determine the desired parameter. To interrogate a different region, the optical signal is configured to have a different optical wavelength, which is reflected by a different reflector and is routed to the different region.

Using certain aspects can result in the pulse rate of the interrogator being higher based on the length of the sensing region. For example, if the entire length of the sensing fiber is 5 kilometers (km), the maximum pulse rate of a interrogator in a non-region system may be limited to 20 kilohertz (kHz) to prevent interference from backscatter of different pulses. The pulse rate can be increased to 100 kHz by separating the sensing fiber into multiple regions that are each, for example, 1 km long. The optical fiber that carries the optical signal transmitted by the interrogator can be optimized for minimum attenuation and have a high non-linearity threshold to stimulated scattering to allow higher optical power to be transmitted. The sensing fiber can be optimized to generate more optical backscatter to increase the signal-to-noise ratio of the backscatter signal received by the interrogator. In some aspects, the sensing fiber can have a higher backscatter coefficient than the optical fiber that carriers the optical signal transmitted by the interrogator.

The interrogator can include a tunable light source. A sensing region can be selected in a round-robin fashion (e.g., ten seconds of interrogation for each region) or based on the needs of a particular implementation. An example of a tunable light source is the Colorado Source by Redfern Integrated Optics, which can be tunable across the C-band while providing a high coherence optical output.

These illustrative aspects and examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative aspects but, like the illustrative aspects, should not be used to limit the present disclosure.

Figure 1:
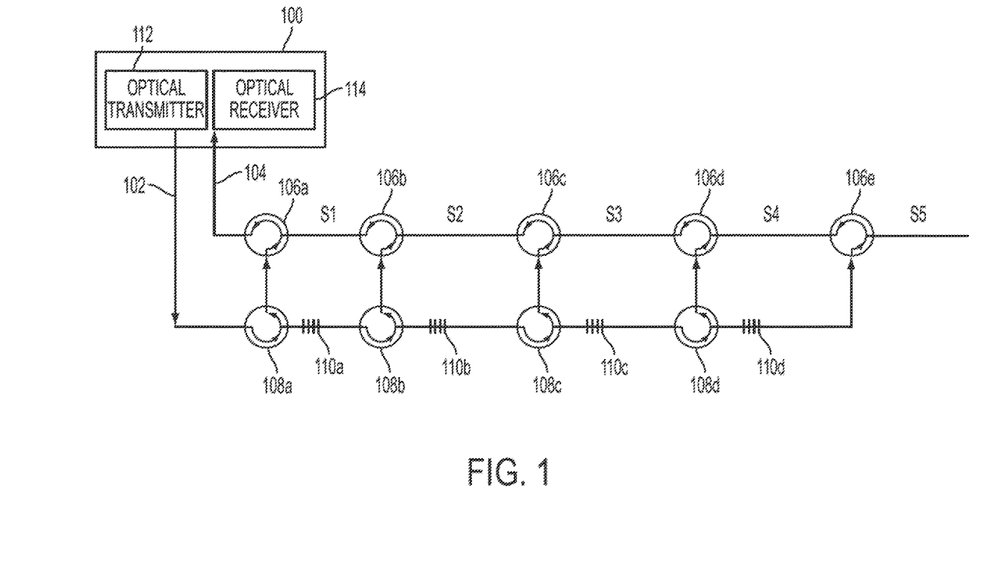
FIG. 1 is a schematic view of a distributed optical fiber sensing system according to one aspect.

FIG. 1 schematically depicts a distributed optical fiber sensing system according to one example. The system includes an interrogator 100 and two optical fibers: a transmission fiber 102 and a sensing fiber 104. The sensing fiber 104 is split into multiple regions S1-S5. Included in the sensing fiber 104 are circulators 106a-e. In some aspects, the circulators 106a-e can define the regions S1-S5. Included in the transmission fiber 102 are circulators 108a-d and reflectors 110a-d. The circulators 106a-e and 108a-d can be three-port circulators, but other types of circulators can be used. Each of the circulators 108a-d can be communicatively coupled to a circulator of circulators 106a-e by an optical fiber. Each reflector is associated with an optical wavelength, and can reflect optical signals at the optical wavelength and allow optical signals at other optical wavelengths to pass. Examples of a reflector include a fiber Bragg grating and a thin film reflector. Each of the transmission fiber 102 and the sensing fiber 104, along with the optical fibers coupling the circulators, can be an optical waveguide.

A three-port circulator is a device with three optical ports. An optical signal that enters a first port can exit from a second port. An optical signal that enters the second port can exit from a third port. An optical signal that enters the third port does not exit from any port and may be absorbed by the device.

The interrogator 100 includes an optical transmitter 112 and an optical receiver 114. The optical transmitter 112 can transmit an optical signal having a selected optical wavelength on the transmission fiber 102. The optical signal can pass through reflectors not associated with the selected optical wavelength and can be reflected by a reflector associated with the selected wavelength. The circulator preceding the reflector associated with the selected wavelength can route the reflected signal to a circulator in the sensing fiber 104. The sensing fiber circulator can route the reflected signal away from the optical receiver 114, which can create a backscatter signal toward the optical receiver 114 in one of the regions S1-S5. The sensing fiber circulator can allow the backscatter signal to pass toward the optical receiver 114 along the sensing fiber 104. The optical receiver 114 can receive the backscatter signal. The backscatter signal can be analyzed to measure a parameter in the region. For example, sensing region S2 can be selected by tuning the wavelength of the transmitter 112 to a value that is reflected by reflector 110b. The reflector 110b can be a fiber Bragg grating or any other type of component that can have a wavelength-selective reflection spectrum. For example, it can be based on dielectric film technology. Furthermore, even though the reflector 110b is shown to be outside of the circulator, the reflector can be included within the same package as the circulator, which can save space.

Although five sensing regions are shown in FIG. 1, any number of sensing regions can be used. A system implemented with two sensing regions, for example, may include three circulators—two in the sensing fiber 104 and one in the transmission fiber 102—and one reflector in the transmission fiber 102. A particular sensing region can be selected by tuning the wavelength of the optical signal outputted by the optical transmitter 112 to be the reflected optical wavelength of a reflector associated with the particular sensing region.

A reflective wavelength of a particular reflector may not be known or the reflective wavelength of a particular reflector may change over time. Distributed optical fiber sensing systems according to some aspects can be calibrated to account for unknown or variable reflector characteristics. For example, the interrogator 100 can include a laser that sweeps across an entire wavelength range and the optical transmitter 112 outputs the optical signals onto the transmission fiber 102. The optical receiver 114 can receive signals from the sensing fiber 104 and record reflectivity peaks to identify the optical wavelength of peak reflectivity of each of the reflectors 110a-d. In another example, broadband gratings (i.e., chirped gratings) can be used that have a wide optical frequency bandwidth near 100% reflectivity. In another example, the reflectors 110a-d are athermal gratings that are not temperature sensitive and are less susceptible to changes. Athermal gratings may be devices packaged such that the usual temperature response of the reflector is compensated by a change in tension in the fiber using passive processes of systems based on the coefficient of thermal expansion and dimensions of the components inside the package.

Figure 2:
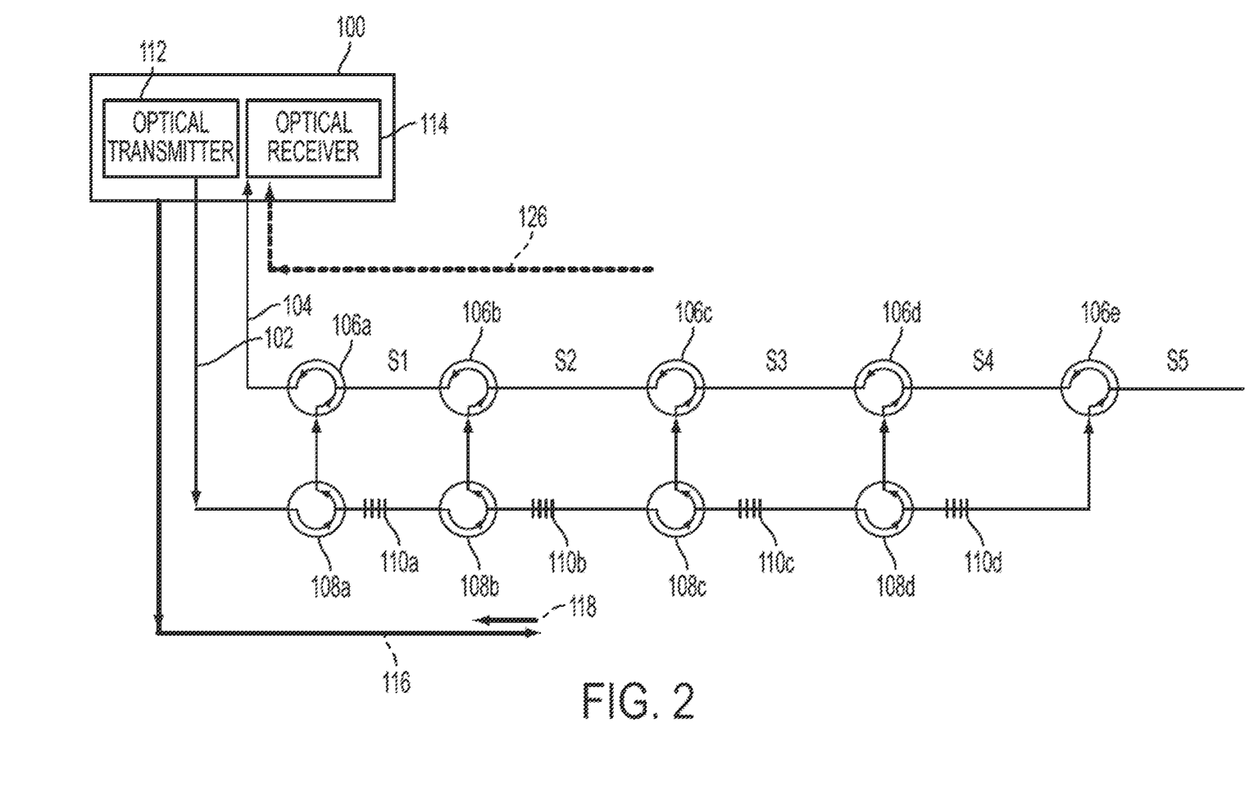
FIG. 2 is a schematic view of the distributed optical fiber sensing system of FIG. 1 in which a region is depicted as being sensed according to one aspect.

FIG. 2 schematically depicts an example of the distributed optical fiber sensing system of FIG. 1 in which region S2 is sensed. Reflector 110b is associated with an optical wavelength unique among the reflectors 110a-d and that is associated within the interrogator 100 to sensing region S2. The optical transmitter 112 can be tuned to the optical wavelength corresponding to the optical wavelength associated with reflector 110b and output an optical signal to the transmission fiber 102. The optical signal can travel along the transmission fiber 102 to the circulator 108a, as indicated by line 116. The circulator 108a receives the optical signal in a first port and routes the optical signal to exit the circulator 108a at a second port. The reflector 110a can be associated with a different optical wavelength such that the optical signal is not reflected by the reflector 110a and travels along the transmission fiber 102 to a first port of the circulator 108b. The circulator 108b can route the optical signal received at the first port to exit a second port of the circulator 108b. The optical signal can travel to the reflector 110b that can reflect the optical signal to create a reflected optical signal that travels toward the second port of the circulator 108b preceding the reflector 110b, as shown by line 118.

The circulator 108b can receive the reflected optical signal in the second port and route the reflected optical signal such that the reflected optical signal exits a third port of the circulator 108b onto an optical fiber toward the circulator 106b in the sensing fiber 104, as shown by line 120. The circulator 106b can receive the reflected optical signal in a first port and can route the reflected optical signal out a second port onto the sensing fiber 104 toward the circulator 106c and away from the optical receiver 114, as shown by line 124, through region S2. The reflected optical signal can generate a backscatter signal in region S2, as shown by line 126, and can be blocked by a third port of the next circulator 106c. The backscatter signal can travel along the sensing fiber 104 and be received by the second port of the circulator 106b that can route the backscatter signal out a third port of the circulator 106b onto the sensing fiber 104. The backscatter signal can pass through the circulator 106a in a similar manner toward the optical receiver 114. The optical receiver 114 can receive and process the backscatter signal as a sensing signal. The backscatter signal may be in the form of Rayleigh, Brillouin, or Raman. The backscatter signal may be coherent or incoherent light.

Figure 3:
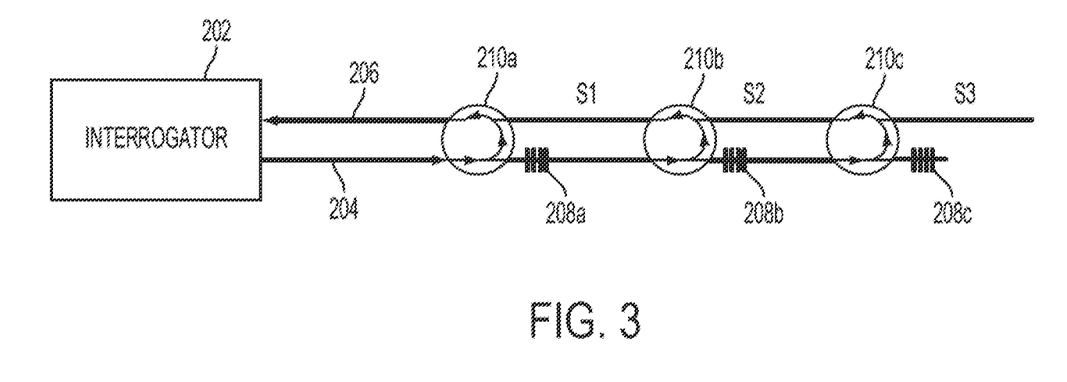
FIG. 3 is a schematic view of a distributed optical fiber sensing system according to another aspect that includes four-port circulators.

FIG. 3 schematically depicts an example of a distributed optical fiber sensing system according to another aspect. The system includes an interrogator 202, a transmission fiber 204, and a sensing fiber 206. The sensing fiber is divided into sensing regions S1-S3. The transmission fiber 204 includes reflectors 208a-c. Each of the reflectors 208a-c can be associated with an optical wavelength of signals that the reflector reflects such that parameters in each of the regions S1-S3 can be selectively and independently measured.

The transmission fiber 204 and the sensing fiber 206 are coupled to circulators 210a-c. The circulators 210a-c are four-port circulators. A four-port circulator is a device with four optical ports. An optical signal that enters a first port can exit from a second port. An optical signal that enters the second port can exit from a third port. An optical signal that enters the third port can exit from a fourth port. An optical signal that enters the fourth port does not exit from any port and can be absorbed by the device.

An optical signal outputted by the interrogator 202 onto the transmission fiber 204 can enter a first port of the circulator 210a, which can cause the optical signal to exit a second port of the circulator 210a toward the reflector 208a. If the optical signal has an optical wavelength that the reflector 208a reflects, the reflected optical signal can be received by the second port of the circulator 210a, which can cause the reflected optical signal to exit the third port of the circulator 210a into the region S1 and toward a fourth part of the circulator 210a. Signals can be blocked by the fourth port of the circulators 210a-c. A backscatter signal entering the third port of the circulator 210a can be routed to exit a fourth port of the circulator 210a toward the interrogator 202.

Figure 4:
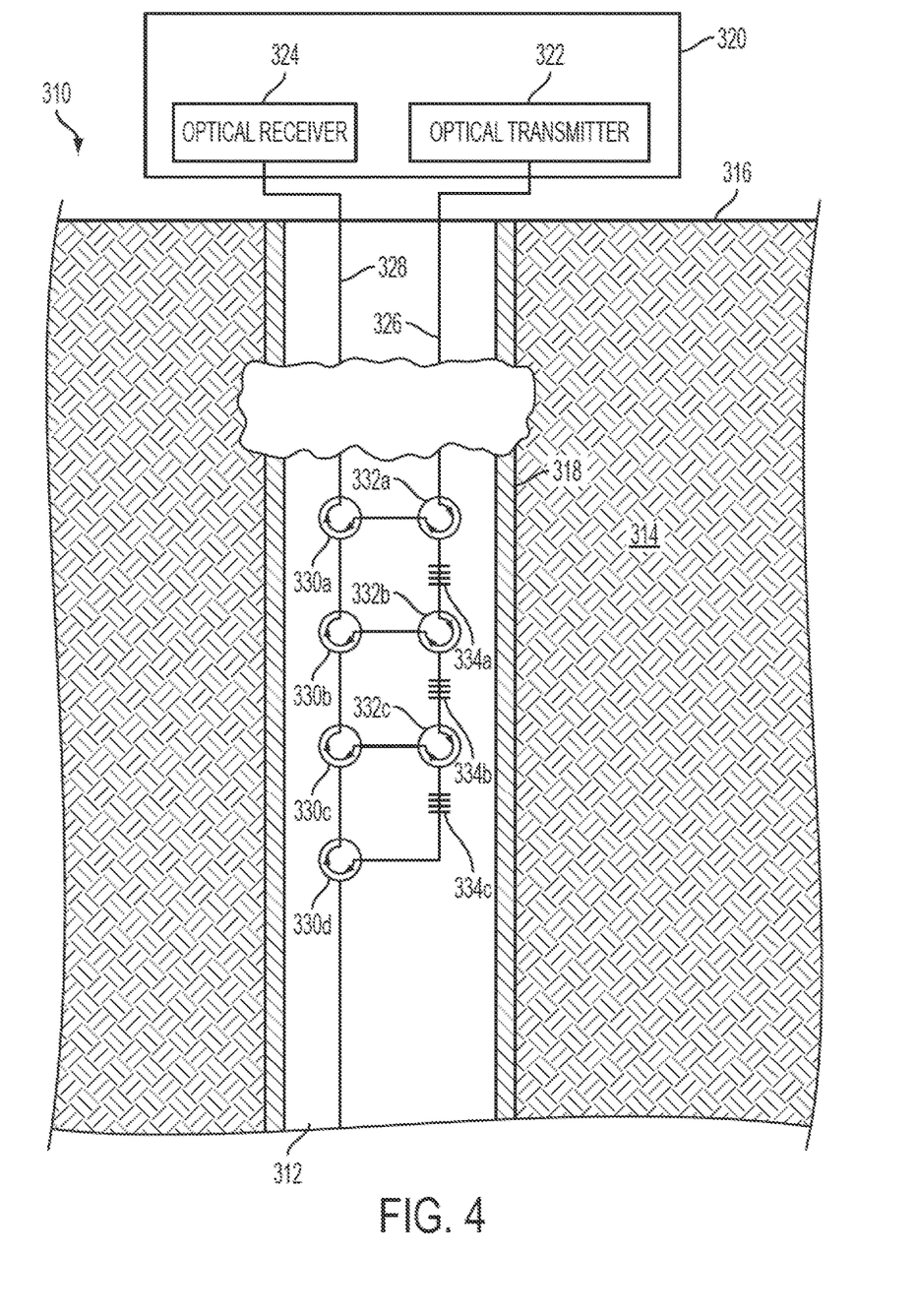
FIG. 4 is a schematic view of a wellbore system that includes a distributed optical fiber sensing system according to one aspect.

Distributed optical fiber sensing systems according to various embodiments can be implemented in a variety of applications and environments. FIG. 4 schematically depicts an example of a wellbore system 310 that includes a distributed optical fiber sensing system according to one aspect. The system 310 includes a wellbore 312 that penetrates a subterranean formation 314 for the purpose of recovering hydrocarbons, storing hydrocarbons, disposing of carbon dioxide, or pumping fluid into the well for stimulation (e.g., fracturing, acidizing, etc.) of producing zones or for storage or disposal. The wellbore 312 may be drilled into the subterranean formation 314 using any suitable drilling technique. While shown as extending vertically from the surface 316 in FIG. 4, in other examples the wellbore 312 may be deviated, horizontal, or curved over at least some portions of the wellbore 312. The wellbore 312 may be cased, open hole, contain tubing, and may include a hole in the ground having a variety of shapes or geometries. The wellbore system 310 includes a casing 318 extending through the wellbore 312 in the subterranean formation 314. Tubulars, such as production tubing, completion strings, and the like, are not shown but may also extend from the surface 316 in an inner area defined by the casing 318.

Some items that may be included in the wellbore system 310 have been omitted for simplification. For example, the wellbore system 310 may include a servicing rig, such as a drilling rig, a completion rig, a workover rig or other mast structure, or a combination of these. In some aspects, the servicing rig may include a derrick with a rig floor. Piers extending downwards to a seabed in some offshore implementations may support the servicing rig. Alternatively, the servicing rig may be supported by columns sitting on hulls or pontoons (or both) that are ballasted below the water surface, which may be referred to as a semi-submersible platform, rig, or drillship. In an off-shore location, a casing or riser may extend from the servicing rig to the sea floor to exclude sea water and contain drilling fluid returns. Other mechanical mechanisms that are not shown may control the run-in and withdrawal of a workstring in the wellbore 312. Examples of these other mechanical mechanisms include a draw works coupled to a hoisting apparatus, a slickline unit or a wireline unit including a winching apparatus, another servicing vehicle, and a coiled tubing unit.

The wellbore system 310 includes the distributed optical fiber sensing system that can sense parameters in multiple regions of the wellbore 312. The distributed optical fiber sensing system includes an interrogator 320 that has an optical transmitter 322 and an optical receiver 324. The distributed optical fiber sensing system also includes optical fibers that are a transmission fiber 326 and a sensing fiber 328. The sensing fiber 328 includes circulators 330a-d, which can define regions in which parameters can be sensed. For example, a first region can be between circulator 330a and circulator 330b, a second region can be between circulator 330b and circulator 330c, a third region can be between circulator 330c and circulator 330d, and a fourth region can be preceded by circulator 330d. The transmission fiber 326 includes circulators 332a-c and reflectors 334a-c, each associated with a different optical wavelength. Each of the circulators 332a-c can be optically coupled to one of the circulators 330a-d of the sensing fiber 328 by an optical fiber.

Each region can be independently sensed by the optical transmitter 322 outputting an optical signal having an optical wavelength corresponding to the reflector associated with the desired region. The optical receiver 324 can receive and analyze a backscatter signal generated in the desired region according to signal flow processes discussed above in connection with FIGS. 1-3.

As an example, a hydraulic fracturing process may be implemented in the wellbore system 310. The region or regions in which the fracturing is occurring can be selected for interrogation and the region or regions in which the fracturing is not occurring can be omitted because, for example, parameters in these latter regions may not be of interest. As fracturing proceeds to other regions, the desired regions can change and the interrogator 320 can modify the output signal for sensing parameters within the new regions of interest.

In other aspects, all regions can be sensed at the same time at a high bandwidth. Multiple optical sources, each tuned to the optical wavelength corresponding to a different sensing region can be used to output multiple optical signals. An interrogator can include a wavelength division multiplexing device that can separate backscattered light from each region and route the backscatter signal to separate detectors for processing into sensor parameters, such as temperature and vibration.

Figure 5:
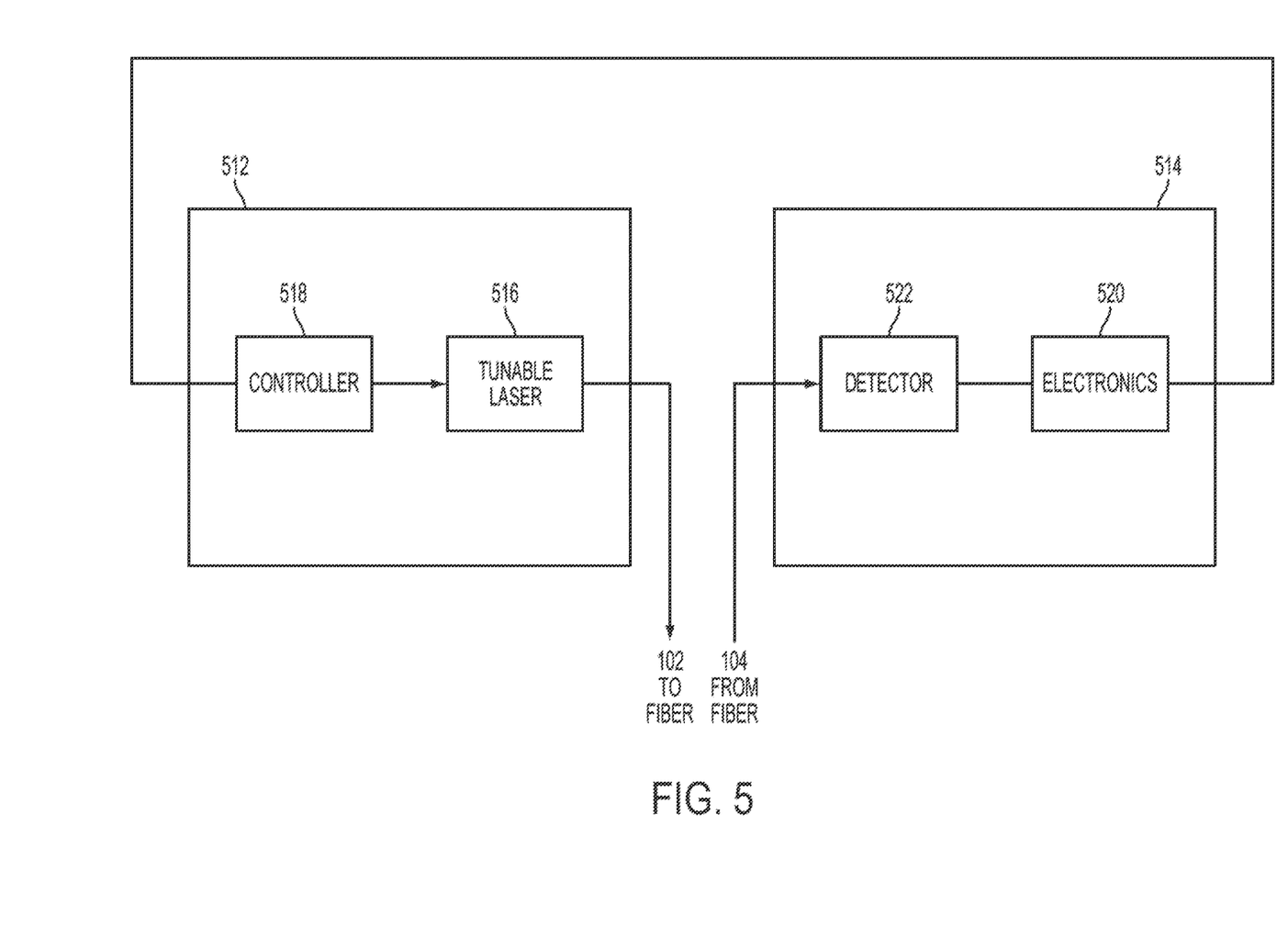
FIG. 5 is a block diagram of an optical transmitter and an optical receiver according to one aspect.

Various types of interrogators can be used in these and other aspects. FIG. 5 depicts by block diagram an example of an interrogator according to one aspect. The interrogator includes an optical transmitter 512 and an optical receiver 514. The optical transmitter 512 includes a tunable laser 516 coupled to the transmission fiber 102 for outputting optical signals as pulses to the transmission fiber 102. The optical transmitter 512 also includes a controller 518. In other aspects, the controller 518 may be in a central control unit that is separate from the optical transmitter 512. The optical receiver 514 includes electronics 520 and an optical detector 522 to detect distributed sensing signals from the sensing fiber 104.

The controller 518 can be communicatively coupled to the tunable laser 516 and to the electronics 520 in the optical receiver 514 for coordinating the timing of the pulses and other information with the tunable laser 516 and to the detector 522 in the optical receiver 514 through the electronics 520.

Figure 6:
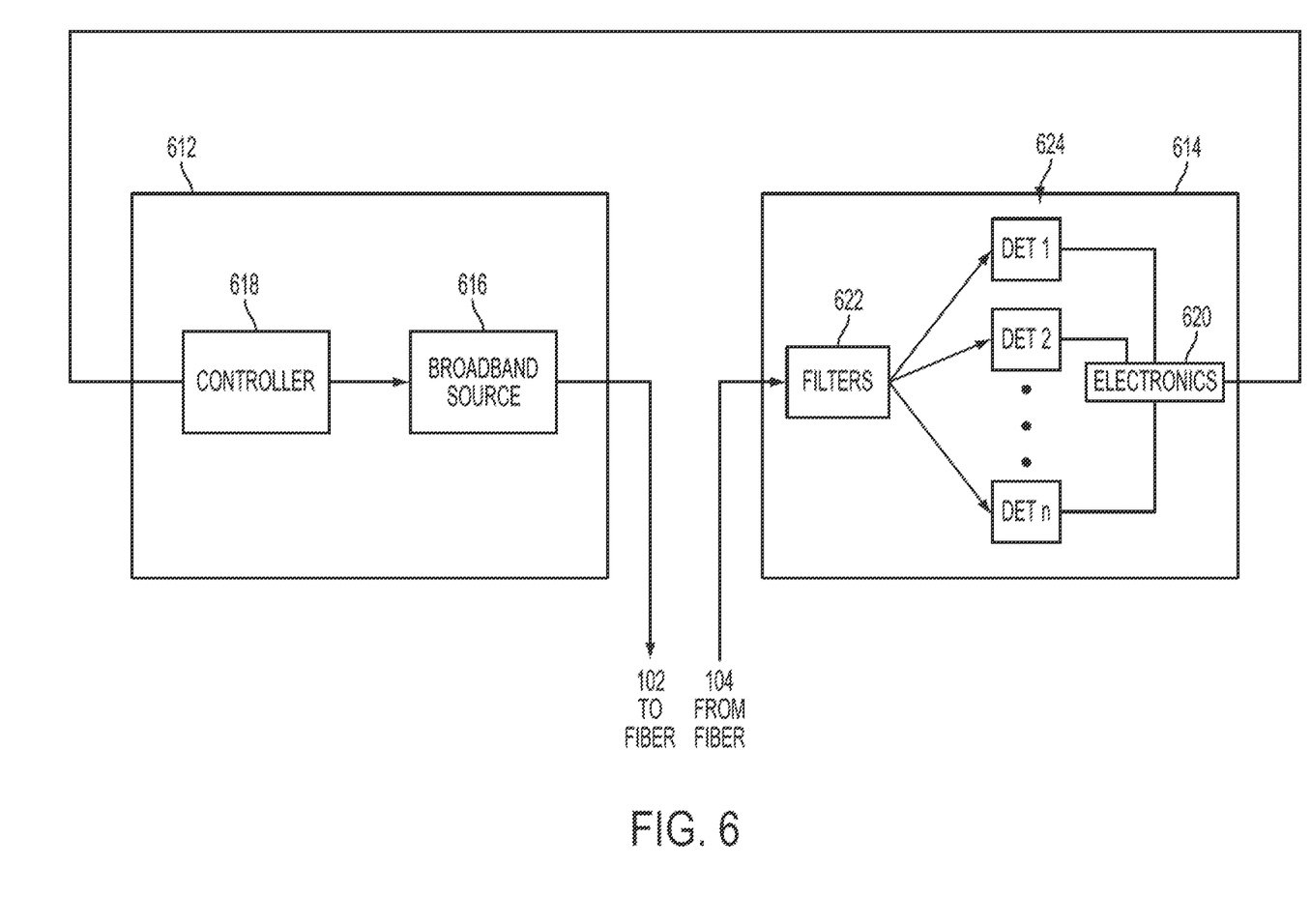
FIG. 6 is a block diagram of an optical transmitter and an optical receiver according to another aspect.

FIG. 6 depicts by block diagram an example of an interrogator according to another aspect. The interrogator includes an optical transmitter 612 and an optical receiver 614. The optical transmitter 612 includes a broadband source 616 and a controller 618, the latter of which can be in a central control unit in other aspects, rather than the optical transmitter 612. The broadband source 616 can be pulsed, as controlled by the controller 618, for outputting a broadband pulsed optical signal to the transmission fiber 102 that can be broken down into narrow wavelength ranges by reflectors. The optical receiver 614 includes electronics 620 communicatively coupled to the controller 618 for coordinating timing and other information. The optical receiver 614 also includes filters 622 and detectors 624. The filters 622 can be coupled to the sensing fiber 104 for separating out wavelengths of signals from various sensed sections of the sensing fiber 104. The detectors 624 can detect signals separately such that multiple sections of the sensing fiber 104 can be interrogated simultaneously.

Figure 7:
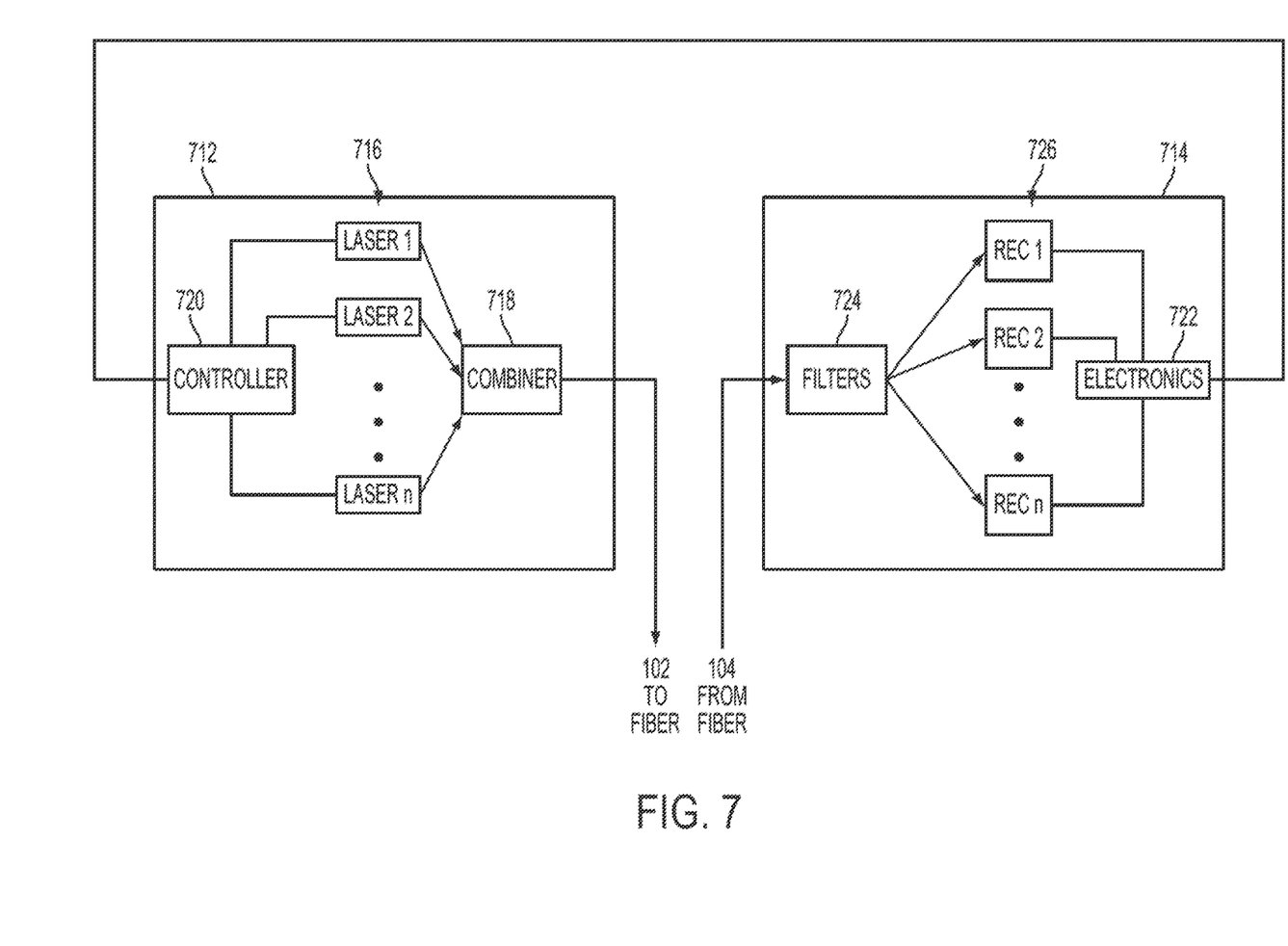
FIG. 7 is a block diagram of an optical transmitter and an optical receiver according to another aspect.

FIG. 7 depicts by block diagram an example of an interrogator according to another aspect. The interrogator includes an optical transmitter 712 and an optical receiver 714. The optical transmitter 712 includes multiple tunable lasers 716 coupled to a combiner 718 that can combine multiple optical signals from the tunable lasers 716 and outputting the combined optical signal to the transmission fiber 102. The combined optical signal can include multiple optical signals at different wavelengths. The optical transmitter 712 also includes a controller 720 for controlling the tunable lasers 716 and coordinating timing and other information with the optical receiver 714. In other aspects, the controller 720 is in a central control unit rather than the optical transmitter 712. The optical receiver 714 includes electronics 722 coupled to the controller 720. The optical receiver 712 also includes filters 724 and receivers 726. The filters 724 can be coupled to the sensing fiber 104 for separating out wavelengths of signals from various sensed sections of the sensing fiber 104. The receivers 726 can detect signals separately such that multiple sections of the sensing fiber 104 can be interrogated simultaneously.

The foregoing description of certain aspects, including illustrated aspects, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
   an interrogator that includes an optical transmitter and an optical receiver;
   a transmission optical fiber optically coupled to the optical transmitter;
   a sensing optical fiber optically coupled to the optical receiver; and
   a plurality of reflectors optically coupled to the transmission optical fiber, each reflector of the plurality of reflectors being positioned within a separate reflector region of a plurality of reflector regions within the transmission optical fiber, the plurality of reflector regions being defined by a first set of circulators, each reflector of the plurality of reflectors further being associated with a distinctive optical wavelength,
   wherein the plurality of reflectors includes a first reflector that is associated with a first wavelength and is responsive to an optical signal in the first wavelength from the optical transmitter by reflecting a reflected optical signal that includes the optical signal to a first circulator of the first set of circulators, the first circulator being positioned between the optical transmitter and the first reflector, and
   wherein the sensing optical fiber is divided into separate sensing regions defined by a second set of circulators, the second set of circulators including a second circulator that is operable for receiving the reflected optical signal from the first circulator and routing the reflected optical signal toward a sensing region of the separate sensing regions to generate a backscatter optical signal corresponding to the reflected optical signal and for communication toward the optical receiver.

2. The system of claim 1, wherein each region of the separate sensing regions has a smaller length than a total length of the sensing optical fiber.

3. The system of claim 1, wherein the first set of circulators are three-port circulators.

4. The system of claim 1, further comprising a linking optical fiber between the first circulator and the second circulator optically coupled to the sensing optical fiber, the second circulator being separate from the first set of circulators.

5. The system of claim 1, wherein the first set of circulators and the plurality of reflectors are disposed in a wellbore.

6. The system of claim 1, wherein the sensing optical fiber has a higher backscattering coefficient than the transmission optical fiber.

7. The system of claim 1, wherein the optical transmitter is operable for outputting a signal that includes multiple wavelengths and the optical receiver is operable for receiving backscatter signals at different wavelengths for simultaneously sensing multiple regions of the sensing optical fiber.

8. The system of claim 1, wherein each sensing region of the separate sensing regions is associated with a different optical wavelength corresponding to the distinctive optical wavelength of each reflector.

9. A method comprising:
   transmitting an optical signal onto a transmission optical fiber, the optical signal having a selected optical wavelength associated with a desired region of a sensing optical fiber;
   reflecting the optical signal by a reflector positioned between two circulators of the transmission optical fiber, the reflector being associated with the selected optical wavelength to generate a reflected optical signal;
   routing, by a first circulator of the two circulators, the reflected optical signal to a second circulator coupled to the sensing optical fiber, the sensing optical fiber being divided into multiple sensing regions that includes the desired region;
   routing, by the second circulator, the reflected optical signal into the desired region to generate a backscatter signal; and
   receiving the backscatter signal from the sensing optical fiber for measuring a parameter of the desired region.

10. The method of claim 9, wherein the optical signal passes through at least one additional reflector associated with a different optical wavelength than the selected optical wavelength.

11. The method of claim 9, wherein the second circulator is a three-port circulator optically coupled to the sensing optical fiber.

12. The method of claim 9, wherein the transmission optical fiber includes a plurality of reflectors positioned in a plurality of separate reflecting regions defined by a plurality of circulators, the plurality of circulators including the first circulator, wherein each reflector is associated with a different region of the multiple sensing regions and with a distinctive optical wavelength.

13. A system comprising:
   a transmission optical fiber including a first plurality of circulators defining a reflector region of the transmission optical fiber, the reflector region including a reflector positioned between two circulators of the first plurality of circulators, the reflector being responsive to an optical signal at an optical wavelength by communicating a reflected optical signal that includes that optical signal to a first circulator of the first plurality of circulators; and
   a sensing optical fiber including a second plurality of circulators defining a sensing region of the sensing optical fiber, the second plurality of circulators including a second circulator that is operable for receiving the reflected optical signal from the first circulator and routing the reflected optical signal toward the sensing region.

14. The system of claim 13, wherein at least part of the transmission optical fiber and at least part of the sensing optical fiber are located in a wellbore through a subterranean formation.

15. The system of claim 14, further comprising an interrogator with an optical transmitter coupled to the transmission optical fiber and an optical receiver coupled to the sensing optical fiber.

16. The system of claim 15, wherein the optical receiver is operable for receiving a backscatter signal generated in the sensing region by the reflected optical signal traveling away from the optical receiver, the sensing region being associated with the optical wavelength.

* * * * *